United States Patent
Beauchemin et al.

(10) Patent No.: US 6,476,111 B1
(45) Date of Patent: Nov. 5, 2002

(54) EXTRUDABLE HIGHLY FILLED THERMOPLASTIC SHEET COMPOSITION

(75) Inventors: Paul Edward Beauchemin, East Auroro, NY (US); Barry Jordan Heitner, East Amherst, NY (US); Clyde Spencer Hutchins, Boston, NY (US); Keith William Pollak, Lewiston, NY (US); Jennifer Leigh Thompson, Williamsville, NY (US)

(73) Assignee: E. I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/919,712

(22) Filed: Aug. 1, 2001

(51) Int. Cl.$^7$ .................................................. C08K 3/30
(52) U.S. Cl. ...................................... 524/423; 524/514
(58) Field of Search ................................ 524/423, 513, 524/514

(56) References Cited

U.S. PATENT DOCUMENTS

| | | | |
|---|---|---|---|
| 3,847,865 A | | 11/1974 | Duggins |
| 4,200,576 A | | 4/1980 | Feyen et al. |
| 4,369,282 A | * | 1/1983 | Campbell .................... 524/445 |
| 4,880,866 A | | 11/1989 | McNally et al. |
| 4,927,870 A | * | 5/1990 | Ogoe et al. ................. 524/140 |
| 4,981,898 A | * | 1/1991 | Bassett ........................ 524/417 |
| 5,141,984 A | * | 8/1992 | Orikasa et al. ............. 524/494 |
| 5,449,722 A | * | 9/1995 | Nishida et al. ............... 525/98 |
| 5,852,113 A | | 12/1998 | Guntherberg et al. |
| 6,005,050 A | * | 12/1999 | Okada et al. ................. 525/68 |
| 6,013,686 A | | 1/2000 | Hamilton et al. |
| 6,214,909 B1 | * | 4/2001 | Masuyama .................. 524/119 |

FOREIGN PATENT DOCUMENTS

EP    0 332 429    9/1989

\* cited by examiner

*Primary Examiner*—Judy M. Reddick

(57) ABSTRACT

A highly filled, extruded solid surface sheet composite which has improved heat resistance, solvent resistance, and mar resistance by combination of glassy polymer and semi-crystalline polymer.

14 Claims, No Drawings

EXTRUDABLE HIGHLY FILLED THERMOPLASTIC SHEET COMPOSITION

BACKGROUND OF THE INVENTION

1. Field of Invention

This invention relates to an extrudable highly filled thermoplastic composition that can be used to produce a decorative surface.

2. Description of the Related Art

The preferred use for the composition of this invention is as a decorative surface, for example in production of counter-tops, vanity tops, bath and shower surfaces, sinks, wall panels and furniture surfacing. The use of partially crosslinked acrylic for the production of spas, tubs and showers is well known in the art. Fiberglass reinforced polyester is also well known for being used in showers. These products serve the market well, but have a deficiency in that they cannot be easily repaired if scratched or stained.

Cultured marble and laminate have been used for many years as countertop materials in the kitchen and bath markets. These products serve the market well, but cannot be repaired if scratched or stained.

To overcome the above deficiencies, filled acrylic and filled polyester crosslinked compositions have been used in the past. U.S. Pat. No. 3,847,865 to Duggins refers to a castable composition for making simulated marble, which comprises an acrylic polymer or a mixture of polymers dissolved in a polymerizable constituent and highly filled with alumina trihydrate. This composition is then cast onto a belt or into a mold then cured to give a flat or shaped article with a reproducible simulated marble pattern. These cast sheets are homogeneous from upper surface to lower surface and are commonly known as solid surface. The ability to restore a marred surface by sanding or scrubbing is known in the trade as renewability and is highly preferred by consumers. CORIAN® solid surfaces, sold by E. I. du Pont de Nemours and Company, Wilmington, Del., is a commercially available solid surface material comprising a cast acrylic matrix filled with alumina trihydrate (ATH) and other fillers. Cast solid surface sheets are generally ¼" to ¾" thick and are produced in high cost specialized equipment so they are more expensive than laminate or cultured marble.

Thinner sheets are commercially available as a thin continuous cast ATH filled acrylic product called SSV made by Wilsonart International (Temple, Tex., USA). The cost remains much higher than for laminate. A second product developed by Wilsonart called SSL is an extruded wollastonite-filled acrylic product. This product is less expensive to produce than continuous cast sheet; however, it has deficiencies in heat resistance and solvent resistance. A hot object (about 120° C.), placed on a countertop constructed from this sheet, will stick to the countertop because the sheet has become soft. Improved resistance to household chemicals such as nail polish remover is desired.

General Electric Plastics (Pittsfield, Mass, USA) markets a sheet composition for the decorative surface market called Enduran™ semi-crystalline, high density polybutylene terephthalate (PBT) engineering material. Spartech Corporation (St. Louis, Mo., USA) extrudes the composition into a sheet and sells it under the trademark Endurex™. This product is an extruded barium sulfate-filled blend of polybutylene terephthalate (PBT), polyethylene terephthalate (PET), and polycarbonate. This product is less expensive to produce than traditional solid surface products. However, increased mar resistance is desired as it mars very easily. Rubbing a fingernail across the surface leaves an area of differing gloss that is objectionable to many customers.

There is a need for an extruded highly filled renewable product that has mar resistance, heat resistance, and solvent (or stain) resistance equal to or at least close to the level normally seen in traditional crosslinked solid surface products.

SUMMARY OF THE INVENTION

The extrudable thermoplastic composition of the invention is formed from a combination by weight of 20–65% glassy polymer, 5–35% semi-crystalline polymer, 0–10% compatibilizing agent for the glassy and semi-crystalline polymers, and 10–70% of a particulate mineral filler wherein the glassy polymer is the major component by a ratio to the semi-crystalline polymer that ranges from 4/1 to 3/2. More preferable is a range from 3/1 to 3/2.

The thermoplastic composite sheet molding composition provided allows the production of thin solid surfacing materials providing the superior properties of conventional thicker solid surfacing with the advantages of handling capabilities and the inexpensive selling cost normally associated with high-pressure decorative laminate. Accordingly, it is a primary object of the invention to provide a highly filled, thermoplastic blended polymeric material having improved resistance to heat, stain, and mar.

It is another object of this invention to provide a highly filled, extruded thermoplastic material which can be extruded into a thin sheet.

DETAILED DESCRIPTION OF THE PREFERRED EMBODIMENTS

The present invention is directed to a highly filled thermoplastic sheet composition comprised of a combination of glassy and semi-crystalline polymers. The sheet exhibits improved resistance to heat, stains, and marring.

The terms "glassy" and "semi-crystalline" refer to the crystallinity of a polymer. As used herein, the term "glassy" refers to amorphous polymers that exhibit a glass transition temperature ($T_g$) but not a melt temperature ($T_m$). Preferably, the $T_g$ is at least usual room temperature of 25 C. These glassy polymers are capable of being repeatedly melt processed in plastic manufacturing machinery. They are often thought of as substitutes for common glass. Glassy polymers include, but are not limited to acrylics, poly (methacrylates), atactic polystyrene, polycarbonate, styrene-acrylonitrile (SAN) and polyvinylchloride (PVC). Specific examples include 20 to 35% poly(methylmethacrylate), preferably 30 to 35% poly(methylmethacrylate).

As used herein, the term "semi-crystalline" refers to polymers that exhibit both the glass transition phase and a melt temperature ($T_m$) Furthermore, the $T_m$ is greater than the intended maximum operating temperature. Kitchen countertops routinely encounter operating temperatures of at least 65 C. but 95 C. is preferable due to high heat applications such as canning or making candy. Therefore, $T_m$ is preferably at least 65 C. Semi-crystalline polymers may be thought of as engineering polymers intended as substitutes for metal and ceramic. Semi-crystalline polymers include, but are not limited to polyester, polyamides (such as nylon 6, nylon 6,6, and nylon 6,12), poly(butyl terephthalate), polyethylterephthalate, thermoplastic polyester elastomers (e.g., Hytrel®), polypropylene, stereoregular polystyrene, aramid, and polyketone. Specific examples include 15 to 20% poly(butyl terephthalate) and 10 to 15% nylon 6,12.

It has been found that the ratio of glassy to semi-crystalline in the composition of the present invention is important to a successful countertop or like surface. The ratio should be such to give a balance of properties related to the stressful use in a kitchen or bath. Semi-crystalline polymers have such poor mar resistance they are easily marred by a simple fingernail scratch but have very good heat resistance. When they are first extruded, the surface is mar resistant; however, if a customer uses an abrasive sponge or cleaner on the surface to remove a stain the polymer layer at the surface is removed and the mar performance is reduced to a level unacceptable to consumers, as they desire the ability to renew a stained, scratched, or marred surface. The ability to renew a surface has helped achieve the popularity of solid surface countertops. Addition of minor amounts of glassy polymers will improve the mar resistance of semi-crystalline polymers, but not enough to effectively eliminate mars in a high wear area. Better performance is achieved by crosslinking the resin or chemically modifying the polymer chain with hard and soft copolymers to disrupt crystallinity. Crosslinked polymers cannot be extruded, thus the benefit of low-cost production is lost. A polymer chain with hard and soft copolymers is a specialty polymer so its cost is high; the benefit of a low cost product is lost. Conversely, glassy polymers have very good optical clarity, UV resistance and mar resistance but suffer from poor heat resistance. Glassy polymer heat resistance improves with crosslinking with, once again, the loss of extrudability. We have discovered a superior extrudeable composition for surfacing sheets with the performance characteristics demanded by consumers when minor amounts of semi-crystalline polymers are added to glassy polymers. The ratio of glassy resin to semi-crystalline resin that provides the best balance of performances is a blend where the glassy resin constitutes the dominant amount, and just enough semi-crystalline resin is present to provide resistance to heat. As previously set forth, the weight of the glassy polymer is 20 to 65% and the semi-crystalline polymer is 5 to 35% of the total filled composition provided at least 10% particulate mineral filler is present. Within these ranges, to maintain glassy polymer as the dominant component, a preferred ratio of glassy/semi-crystalline polymer is in a range from 4/1 to 3/2. More preferred is a range from 3/1 to 3/2.

Optionally, compatibilizing agents are added to polymer blends to improve the synergy of the blended materials. To blend polymers, the materials are typically heated and sheared, as in an extruder or a blender. In the absence of shear, as in an extruder die or a hot press, the distributed molten polymer domains will coalesce. If this coalescence is permitted, then the properties of the final blend are often poor. Examples of performances that suffer when blends are not compatibilized are toughness, tensile and flexural strength, hardness, and heat resistance. Compatibilizing agents are materials that exhibit an affinity for each of the components of the blend and inhibit the coalescence of molten domains. Compatibilizing agents include but are not limited to emulsifiers, surfactants, detergents, ethylene vinyl acetate carbon monoxide terpolymer such as Elvaloy® (sold by E. I. DuPont de Nemours & Co, Wilmington, Del., USA), ethylene/n-butyl acrylate/glycidyl methacrylate, ethylene/ methacrylic ionomeric copolymer such as Surlyn® (also available from DuPont), maleic anhydride grafted polyolefin resins such as Fusabond® (also available from DuPont), core-shell, random copolymer, block copolymers, branched copolymers, or combinations thereof. Generally, the compatibilizers, if employed, will not exceed 10% by weight of a composition, also based on the glassy and semi-crystalline polymers as well as filler. Examples include up to 4% ethylene/n-butyl acrylate/glycidyl methacrylate copolymer and up to 6% ethylene/methacrylic ionomeric copolymer. When the glassy polymer is poly(methylmethacrylate) and the semi-crystalline polymer is poly(butyl terephthalate) the preferred compatibilizer is ethylene/n-butyl acrylate/ glycidyl methacrylate in a range from 2–6% by weight. When the glassy polymer is poly(methylmethacrylate) and the semi-crystalline polymer is nylon 6,12 the preferred compatibilizer is up to 4% ethylene/n-butyl acrylate/ glycidyl methacrylate, or up to 6% ethylene/methacrylic ionomeric copolymer, or a combination thereof.

The thermoplastic composition includes particulate mineral filler. In general, this filler increases the hardness, stiffness or strength of the final article relative to the pure polymer or combination of pure polymers. It will be understood, that in addition, the mineral filler can provide other attributes to the final article. For example, it can provide other functional properties, such as flame retardance, or it may serve a decorative purpose and modify the aesthetics. Some representative fillers include alumina, alumina trihydrate (ATH), alumina monohydrate, aluminum hydroxide, aluminum oxide, aluminum sulfate, aluminum phosphate, aluminum silicate, Bayer hydrate, borosilicates, calcium sulfate, calcium silicate, calcium phosphate, calcium carbonate, calcium hydroxide, calcium oxide, apatite, glass bubbles, glass microspheres, glass fibers, glass beads, glass flakes, glass powder, glass spheres, barium carbonate, barium hydroxide, barium oxide, barium sulfate, barium phosphate, barium silicate, magnesium sulfate, magnesium silicate, magnesium phosphate, magnesium hydroxide, magnesium oxide, kaolin, montmorillonite, bentonite, pyrophyllite, mica, gypsum, silica (including sand), ceramic microspheres and ceramic particles, powder talc, titanium dioxide, diatomaceous earth, wood flour, borax, or combinations thereof. A specific example is 40 to 50% barium sulfate.

Furthermore, the fillers can be optionally coat-treated with coupling agents, such as silane (meth)acrylate available from OSI Specialties (Friendly, VN) as Silane 8 Methacrylate A-174. The filler is present in the form of small particles, with an average particle size in the range of from about 5–500 microns.

ATH is often a preferred filler for poly (methylmethacrylate) (PMMA) systems because the refractive indexes of the two materials are similar. ATH presents problems when used as the filler in a solid surface product produced in an extrusion process since it releases water at processing temperatures. Therefore when ATH is employed as a filler, a two step process (described below) can be employed. Barium sulfate has been found to extrude well and achieve the heat and chemical resistance required for countertop applications and is the preferred filler.

Examples of some functional fillers which can be included in addition to the mineral filler are antioxidants (such as ternary or aromatic amines, Irganox® (a registered trademark of Ciba Geigy), and sodium hypophosphites), flame retardants (such as halogenated hydrocarbons, mineral carbonates, hydrated minerals, and antimony oxide), UV stabilizers (such as Tinuvin supplied by Ciba Geigy), stain-resistant agents (such as poly(tetrafluoroethylene) (e.g., Teflon® a trademark of DuPont), stearic acid, and zinc stearate), or combinations thereof. Optionally, alumina ($Al_2O_3$) may be added to improve resistance to marring. Fibers (e.g., glass, nylon, and carbon) can be added to improve mechanical properties.

The thermoplastic composition can optionally include decorative fillers. Such decorative fillers, although they may have a minor effect on physical properties, are present primarily for aesthetic reasons. Examples of suitable decorative fillers include pigments and other water-insoluble colorants, reflective flakes, metal particles, rocks, colored glass, colored sand of various sizes, wood products, such as fibers, pellets and powders, and others. The particle size will vary with the nature of the decorative filler and can be as large as several centimeters. It is permissible to include minor amounts of additives such as dyes, parting agents, fluidizing agents, viscosity control agents, curing agents, antioxidants, and the like as are known to those of ordinary skill in the art, as long as they do not detract from the mechanical properties of the invention.

Sheet can be produced in a one step process by direct sheet extrusion or in a two step process. In direct extrusion polymer, additives and filler can be added to a twin screw extruder or a co-kneader where the resin is melted and the filler is uniformly dispersed in the melt. The melt then flows to a gear pump and into a sheet die. In the two step process, additives and filler are added to a twin screw extruder or a co-kneader where the resin is melted and the filler is uniformly dispersed in the melt. The melt then flows to strand die and then to either a melt cutter or to a cooling trough and a pelletizer. The pellets and possibly a colorant are then added to a single screw extruder. The melt exiting the single screw extruder is usually sent to a gear pump and then into a sheet die. The extrudate is then processed through calendaring rolls to achieve the desired finish.

Extrusion is the preferred process to produce sheet from the composition of the invention. Water and steam interfere with the extrusion of polymers. Therefore, it is preferable to select polymers, compatibilizers, mineral fillers and functional fillers that do not contain water or produce water during extrusion. Care should be taken when using hydrates as they will evolve off water of hydration at typical extruder temperatures.

The present invention will now be described more specifically with reference to the following working examples and comparative examples. However, the present invention is not in any way limited by the following examples. All quantities are reported in weight percent unless otherwise noted.

EXAMPLES 1–2

A blend of 30.6 wt. % of the glassy acrylic resin MS983 (supplied by Ineos, Southampton, England) and 20.4 wt. % of the semi-crystalline resin Crasting® 6129 polybutyl terephthalate (supplied by E. I. duPont de Nemours and Company, Wilmington, Del.) was compatibilized with Elvaloy® 4170 copolymer of ethylene/ n-butyl acrylate (BA)/ and glycidyl methacrylate (GMA) copolymer (known as E/BA/GMA rubber) (supplied by E. I. duPont de Nemours and Company, Wilmington, Del.) at 4 wt. %. In Example 1, the filler was 45 wt. % 12 micron $BaSO_4$ (Cimbar PC, supplied by CIMBAR Performance Minerals, Cartersville, Georgia). In Example 2 the filler was 30 wt. % Cimbar PC mixed with 15 wt. % RCF-015 15 micron glass (supplied by Nippon Glass Fiber Co., LTD).

EXAMPLES 3–4

In Example 3 and 4, 34.3 wt. % of the glassy acrylic resin MS983 and 14.7 wt. % of the semi-crystalline resin Zytel® 158 (Nylon 6,12, supplied by DuPont). The polymers are compatibilized by a combination of 4 wt. % Surlyn® 7940 (ethylene/methacrylic acid ionomer supplied by DuPont) and 2 wt. % Elvaloy® 4170. In Example 3, the filler was 45 wt. % Cimbar PC. In Example 4, the filler was a combination of 30 wt. % Cimbar PC mixed with 15 wt. % RCF-015 15 m glass (supplied by Nippon Glass Fiber Co., LTD).

Control 5

Semi-crystalline polybutyl terephthalate, Crastin® 6129, which made up 28 wt. % of the final composition was added to the glassy thermoplastic ethylene/methacrylic acid copolymer (Surlyn® 9945, supplied by DuPont) which made up 25 wt. % of the composition. This grade of Surlyn® has a Tg less than 25 C. The polymers were compatibilized with 2 wt. % of Elvaloy 4170 E/BA/GMA rubber. The filler was BaSO4 (Blanc Fixe, supplied by Polar Mineral) at 45 wt. % of the final composition.

Control 6

The glassy resin poly(methyl methacrylate) (Plexiglas® VO 45, supplied by Atofina Chemicals, Philadelphia, Pa., USA) made up 42.0 wt. % of comparative example without a semi-crystalline component. Elvaloy(® 4170 E/BA/GMA rubber made up 6.0 wt. % of the composition as a toughener. The filler was a combination of $BaSO_4$ (Blanc Fixe, supplied Polar Mineral) at 33 wt. %, plus 5.0 wt. % of Glass Fritz plus 10.0 wt. %, and rigid, inert, hollow ceramic (sold under the trade name Zeospheres by 3M Corporation). A color concentrate, 4.0 wt. % was added.

Control 7

A comparative example comprising only semi-crystalline polymers contained 45 wt. % Crastin® 6129, 15 wt. % Zytel® 42A, 3.0 wt. % Elvaloy® 4170, and 37 wt. % Blanc Fixe as the filler.

The above samples were extruded on a 27mm Leistritz twin screw extruder (American Leistritz Extruder Corporation, Somerville, N.J.) with a gear pump and sheet die. The extrudate was processed through calendaring rolls into a 0.80" thick ×10" wide sheets and tested for the surface properties mentioned above.

Results

All of the samples were subjected to a battery of test to determine various physical properties. To determine heat-resistance, samples were tested using NEMA LD3, section 3.25 Radiant Heat Resistance. A "passing" grade was awarded to samples that could withstand temperatures greater than 200° C. without failure (examples of failures are discoloring, blistering, boiling, physical deformation, sticking, and gloss change). Stain-Resistance was determined using NEMA LD3, section 3.4 Cleanability / Stain Resistance and ANSI Z124 "For Stain, Chemical, and Cigarette Resistance." A "passing" grade was awarded to samples that exhibited stain resistance as good as or better than commercially available solid surfaces.

Mar-resistance was determined using three unlaminated samples with dimensions 21/4"×6". Samples were surface sanded with 150-grit paper and given 45 strokes on a Crockmeter (Atlas Electronic Devices Co., model CM-5) equipped with an arm exerting 9 N of force on the sample. The arm contacts the composite via a finger covered with a cotton cloth. Ratio of the gloss at 60°, Gm, of the un-marred surface, Go, to that of the marred surface (Go/Gm) is calculated. Go/Gm=1 indicates perfect mar-resistance. Any score greater than 0.44 was a "PASS". The passing score was set based on performance of commercially available surfacing sheets. Thin sheets comprised of blends that are predominately semi-crystalline with a minor component of glassy polymer are considered poor performers in regards to mar and typically measure about 0.2–0.3. Typical acrylic based solid surface products considered to have good mar performance statistically score about 0.4–0.5. Therefore, 0.44 was selected as the minimum score needed to obtain a commercially acceptable mar resistant surface. Table 1 summarizes the results.

TABLE 1

| Sample | Heat | Stain | Mar |
|---|---|---|---|
| Example 1 | PASS | PASS | PASS |
| Example 2 | PASS | PASS | PASS |
| Example 3 | PASS | PASS | PASS |
| Example 4 | PASS | PASS | PASS |
| Control 5 | PASS | PASS | FAIL |
| Control 6 | FAIL | PASS | PASS |
| Control 7 | PASS | FAIL | FAIL |

What is claimed is:

1. An extrudable molding composition, comprising by weight based on components (a) to (d):
   (a) 20–65% glassy polymer; and
   (b) 5–35% semi-crystalline polymer; and
   (c) 0–10% compatibilizing agent for said glassy and said semi-crystalline polymer; and
   (d) 10–70% particulate mineral filler;.
   wherein the ratio of said glassy polymer to said semi-crystalline polymer is in a range from 4/1 to 3/2; said glassy polymer has a glass transition temperature of at least 25° C. and is an acrylic polymer; said semi-crystalline polymer has a melt temperature of at least 65° C. and is a polyester polymer.

2. The composition of claim 1, wherein:
   said acrylic polymer is poly(methylmethacrylate); and
   said polyester polymer is poly(butyl terephthalate).

3. The composition of claim 2, wherein:
   the compatibilizing agent is ethylene/n-butyl acrylate/ glycidyl methacrylate copolymer; and
   the particulate mineral filler is barium sulfate.

4. The composition of claim 3, wherein:
   said acrylic polymer is 20–35% poly (methylmethacrylate); and
   said polyester polymer is 15–20% poly(butyl terephthalate); and
   said compatibilizer is 2–6% ethylene/n-butyl acrylate/ glycidyl methacrylate copolymer; and
   said particulate mineral filler is 40–50% barium sulfate.

5. The composition of claim 1, wherein the ratio is in a range from 3/1 to 3/2.

6. The composition of claim 1, wherein said combatibilizing agent is present.

7. The composition of claim 1, wherein said particulate mineral filler does not contain water or water of hydration.

8. An extrudable molding composition, comprising by weight based on components (a) to (d):
   (a) 20–65% glassy polymer; and
   (b) 5–35% semi-crystalline polymer; and
   (c) 0–10% compatibilizing agent for said glassy and said semi-crystalline polymer; and
   (d) 10–70% particulate mineral filler; wherein the ratio of said glassy polymer to said semi-crystalline polymer is in a range from 4/1 to 3/2;
   said glassy polymer has a glass transition temperature of at least 25° C. and is an acrylic polymer;
   said semi-crystalline polymer has a melt temperature of at least 65° C. and is a polyamide polymer.

9. The composition of claim 8 wherein:
   said acrylic polymer is poly(methylmethacrylate); and
   said polyamide is nylon 6,12.

10. The composition of claim 9 wherein:
    said compatibilizing agent is selected from the group consisting of ethylene/n-butyl acrylate/ glycidylmethacrylate copolymer, ethylene/methacrylic ionomeric copolymer, and a combination thereof; and
    said particulate mineral filler is barium sulfate.

11. The composition of claim 10 wherein:
    said acrylic polymer is 30–35% poly (methylmethacrylate); and
    said polyamide polymer is 10–15% nylon 6,12; and
    said compatibilizing agent is up to 4% ethylene/n-butyl acrylate/glycidyl methacrylate copolymer, up to 6% ethylene/methacrylic ionomeric copolymer, and a combination thereof; and said particulate mineral filler is 40–50% barium sulfate.

12. The composition of claim 8 wherein the ratio is in a range from 3/1 to 3/2.

13. The composition of claim 8, wherein said compatibilizing agent is present.

14. The composition of claim 8, wherein said particulate mineral filler does not contain water or water of hydration.

* * * * *